United States Patent
Hung et al.

(10) Patent No.: US 9,811,946 B1
(45) Date of Patent: Nov. 7, 2017

(54) HIGH RESOLUTION (HR) PANORAMA GENERATION WITHOUT GHOSTING ARTIFACTS USING MULTIPLE HR IMAGES MAPPED TO A LOW RESOLUTION 360-DEGREE IMAGE

(71) Applicants: Kwok Wai Hung, Hong Kong (HK); Luhong Liang, Hong Kong (HK); Xuejiao Liu, Guangdong (CN)

(72) Inventors: Kwok Wai Hung, Hong Kong (HK); Luhong Liang, Hong Kong (HK); Xuejiao Liu, Guangdong (CN)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 31 days.

(21) Appl. No.: 15/168,156

(22) Filed: May 30, 2016

(51) Int. Cl.
*G06T 3/40* (2006.01)
*G06T 19/00* (2011.01)
*H04N 5/232* (2006.01)

(52) U.S. Cl.
CPC .......... *G06T 19/006* (2013.01); *G06T 3/4038* (2013.01); *H04N 5/23238* (2013.01); *G06T 2200/04* (2013.01)

(58) Field of Classification Search
CPC .. H04N 5/23238; H04N 19/85; H04N 1/3876; H04N 21/21805; H04N 5/2628;

(Continued)

(56) References Cited

U.S. PATENT DOCUMENTS 6,003,998 A    12/1999    St. Hilaire
6,434,280 B1    8/2002    Peleg et al.
(Continued)

FOREIGN PATENT DOCUMENTS

CN    102629373 A    8/2012
CN    103440664 A    12/2013
(Continued)

OTHER PUBLICATIONS

Brown & Lowe, "Automatic Panoramic Image Stitching using Invariant Features", IJCV 2007, (University of British Columbia, AutoStitch freeware), Dec. 2006.
(Continued)

*Primary Examiner* — Sultana M Zalalee
(74) *Attorney, Agent, or Firm* — Stuart T. Auvinen; gPatent LLC (57) ABSTRACT

A hybrid-resolution panoramic VR generator places High-Resolution (HR) patches from a ring of HR cameras onto a 360-degree Low-Resolution (LR) image from a LR camera pointing upward from the ring into a panoramic mirror that captures the combined field of view of all the multiple HR cameras, but at a lower resolution. Ghosting artifacts caused by parallax errors between adjacent HR cameras are eliminated because object placement is determined by the 360-degree LR image. Each HR image is homographicly projected into 3 projections by grouping objects of different depths to obtain homographic matrixes. The 360-degree LR image is upscaled to HR and a query patch is searched in search windows in the three projections for up to two adjacent HR images. Best-matching patches are weighted by similarity with the query patch and blended to generate a reconstructed patch placed at the query patch location in a reconstructed HR panorama image.

20 Claims, 8 Drawing Sheets

(58) Field of Classification Search
CPC ..... H04N 7/181; G06T 3/4038; G06T 3/4053; G06T 11/00

See application file for complete search history.

(56) References Cited

U.S. PATENT DOCUMENTS

| | | |
|---|---|---|
| 6,738,073 B2 | 5/2004 | Park et al. |
| 6,977,676 B1 | 12/2005 | Sato et al. |
| 7,006,709 B2 | 2/2006 | Kang et al. |
| 7,130,490 B2 | 10/2006 | Elder et al. |
| 7,525,567 B2 | 4/2009 | McCutchen |
| 7,889,948 B2 | 2/2011 | Steedly et al. |
| 2002/0126395 A1 | 9/2002 | Gianchandani et al. |
| 2003/0179923 A1 | 9/2003 | Xiong et al. |
| 2006/0103723 A1 | 5/2006 | Scire, Jr. |
| 2011/0013028 A1* | 1/2011 | Zhou .............. G06T 3/4038 348/208.6 |
| 2011/0141229 A1 | 6/2011 | Stec et al. |
| 2012/0086850 A1* | 4/2012 | Irani .............. G06T 3/4053 348/441 |
| 2013/0034313 A1* | 2/2013 | Lin ............... G06T 3/4053 382/299 |
| 2014/0362176 A1 | 12/2014 | St. Clair et al. |
| 2015/0324952 A1 | 11/2015 | Namboodiri et al. |
| 2016/0063677 A1* | 3/2016 | Deamo ............ G06T 3/4053 382/199 |

FOREIGN PATENT DOCUMENTS

| | | |
|---|---|---|
| CN | 103780863 A | 5/2014 |
| WO | WO 2008/010345 A1 | 1/2008 |

OTHER PUBLICATIONS

Hung and Siu, "Novel DCT-Based Image Up-Sampling Using Learning-Based Adaptive k-NN MMSE Estimation", IEEE Trans Circuits and Systems for Video Tech., vol. 24, No. 12. Dec. 2104, pp. 2018-2033.

Baldwin et al., "Panoramic Video with Predictive Window for Telepresence Applications", Proc. IEEE Int'l Conf. on Robotics & Automation, May 1999, pp. 1922-1927.

ISR and Written Opinion, PCT/CN2016/093288, dated Mar. 1, 2017, 12pp.

* cited by examiner

HIGH RESOLUTION (HR) PANORAMA GENERATION WITHOUT GHOSTING ARTIFACTS USING MULTIPLE HR IMAGES MAPPED TO A LOW RESOLUTION 360-DEGREE IMAGE

FIELD OF THE INVENTION

This invention relates to 3D graphics, and more particularly to Virtual Reality (VR) panorama generation.

BACKGROUND OF THE INVENTION

Virtual Reality (VR) is an emerging "killer application" that has the potential to radically transform existing ways of doing various tasks. A 360-degree panoramic video is captured and used to create a computer-modeled 3D space. Then a user wearing special goggles such as a Head-Mounted-Display (HMD) can actively select and vary his viewpoint to get an immersive experience.

A wide variety of interesting and useful applications are possible as VR camera technology improves and shrinks. A helmet cam such as a GoPro camera could be replaced by a VR panorama camera set to allow the capture of 360-degree panoramas while engaging in various sports activities such as mountain biking, skiing, skydiving, traveling, etc. A VR camera could also be placed on an aerial drone, to allow for VR modeling of an aerial inspection of a construction site, or for travel blogging or video surveillance. A VR camera placed at a family gathering could allow a remote relative to be immersed in the family event using a VR headset. A VR camera on a self-driving car or on a drone could provide input to auto-driving or auto-flying control systems.

How the 360-degree panoramic video is captured and generated can affect the quality of the VR experience. When multiple cameras are used, regions where two adjacent camera images intersect often have visual artifacts and distortion such as ghosting that can mar the user experience, or even give the user a headache !

Figure 1:
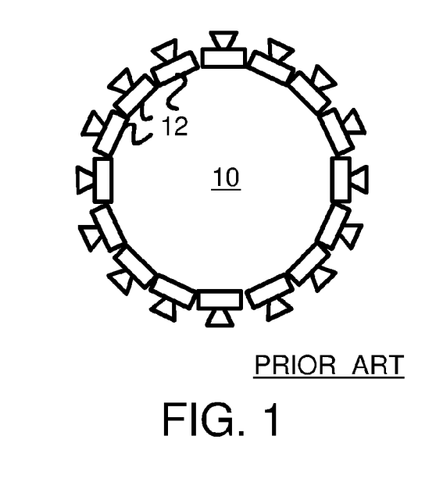
FIG. 1 shows a prior-art VR ring camera.

FIG. 1 shows a prior-art VR ring camera. Ring camera 10 has multiple cameras 12 arranged in a ring. This arrangement of cameras 12 allows for a 360-degree panorama to be captured. When cameras 12 are video cameras, a panoramic video is captured. The Google Jump is an example of a VR ring camera.

Figure 2A:
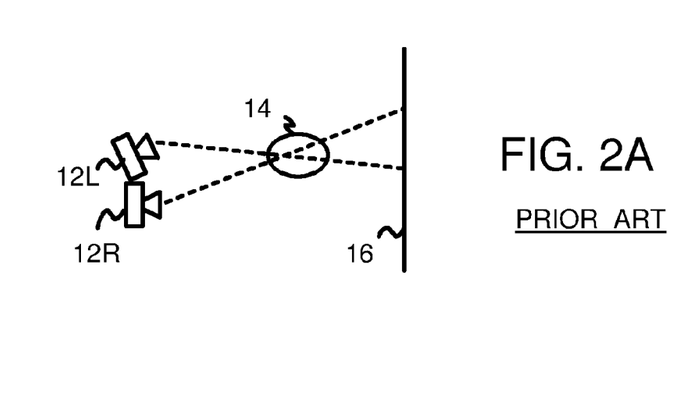
FIGS. 2A-C highlight ghosting artifacts created by parallax errors where images from two adjacent cameras are stitched together.
Figure 2B:
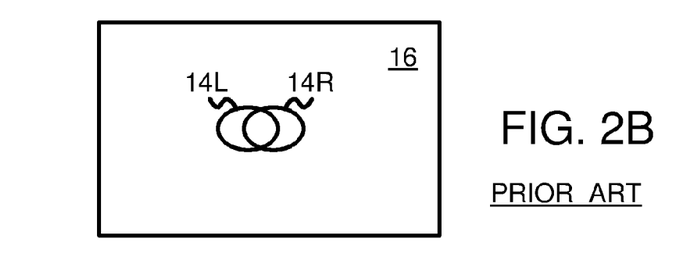
Figure 2C:
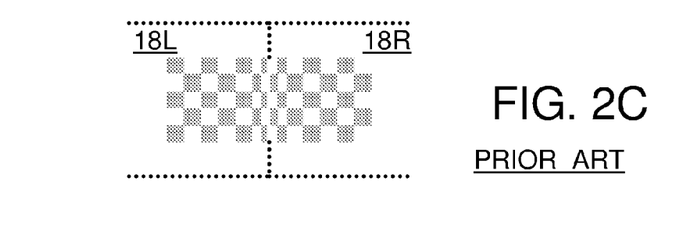

FIGS. 2A-C highlight ghosting artifacts created by parallax errors where images from two adjacent cameras are stitched together. In FIG. 2A, cameras 12L, 12R are two adjacent cameras in ring camera 10 of FIG. 1. Object 14 is captured by both cameras 12L, 12R. However, since object 14 is a different distance and angle to each of cameras 12L, 12R, each camera 12L, 12R sees object 14 at a different location on image frame 16.

In FIG. 2B, object 14 may appear on image fame 16 as two different objects 14L, 14R seen by cameras 12L, 12R. Image processing software may attempt to estimate the depth of object 14 relative to each of cameras 12L, 12R to correct the parallax error, but depth estimation is inexact and challenging. This object matching and depth estimation may result in non-linear warping of images. As FIG. 2C shows, distortion may be especially visible near interfaces where adjacent images 18L, 18R are stitched together. The test pattern is distorted at the interface between images 18L, 18R. Square boxes are squished and narrowed at the interface. This ghosting is undesirable.

What is desired is a Virtual Reality (VR) panorama generator that reduces or eliminates ghosting artifacts at interfaces where images from adjacent cameras are stitched together. A panorama generator that does not require depth estimation is desirable. A panorama generator that places high-resolution images over a low-resolution panoramic image is desired to eliminate stitching regions and ghosting artifacts.

DETAILED DESCRIPTION

The present invention relates to an improvement in VR panorama generation. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3A:
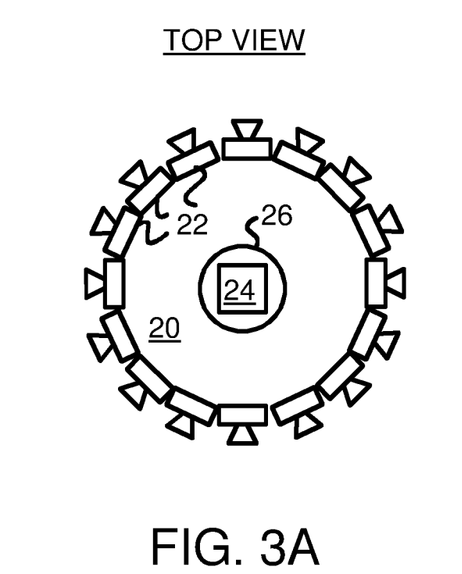
FIGS. 3A-B show a hybrid LR/HR panoramic VR camera rig.
Figure 3B:
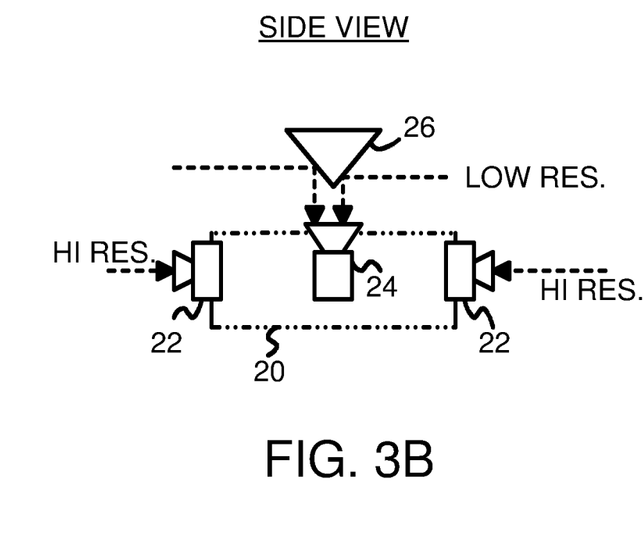

FIGS. 3A-B show a hybrid LR/HR panoramic VR camera rig. Hybrid camera rig 20 has a ring of High-Resolution (HR) cameras 22 arranged in a circle. Hybrid camera rig 20 also has Low-Resolution (LR) camera 24 with a lens pointing upward out of the plane of the ring of HR cameras 22. LR camera 24 takes an image of the reflection in panoramic mirror 26. Panoramic mirror 26 can be a conical, spherical, parabolic, elliptical, hyperbolic, curved, or other shaped mirror. The shape of panoramic mirror 26 allows a larger field of view to be captured by LR camera 24 than by any one of HR cameras 22.

As seen from the side view of FIG. 3B, panoramic mirror 26 collects light from all 360 degrees and reflects or bends this light to be perpendicular to the plane of the ring of HR cameras 22. The bent light from panoramic mirror 26 is collected by the lens of LR camera 24. Panoramic mirror 26 collects light from all angles or arcs of the panoramic circle while each of HR cameras 22 collects light from only a smaller segment of the full panoramic circle. However, the image generated by LR camera 24 has a lower resolution than the images generated by HR cameras 22.

LR camera 24 generates a single image of the entire panorama, but at a low resolution. Since there is a single image, there is no interface between multiple images taken by adjacent cameras. There is no stitching together of adjacent images, so there are no ghosting artifacts from LR camera 24.

HR cameras 22 provide high-resolution details such as texture than can be superimposed on the single image from LR camera 24.

Figure 4A:
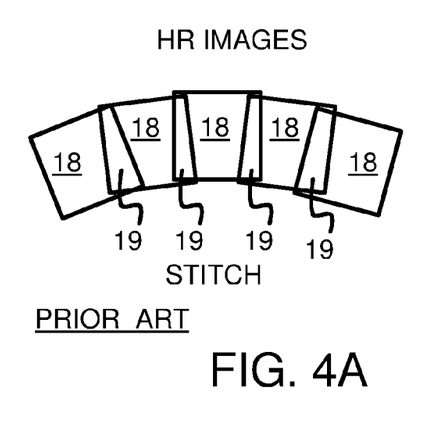
FIGS. 4A-C highlight image processing of panoramic camera images.
Figure 4B:
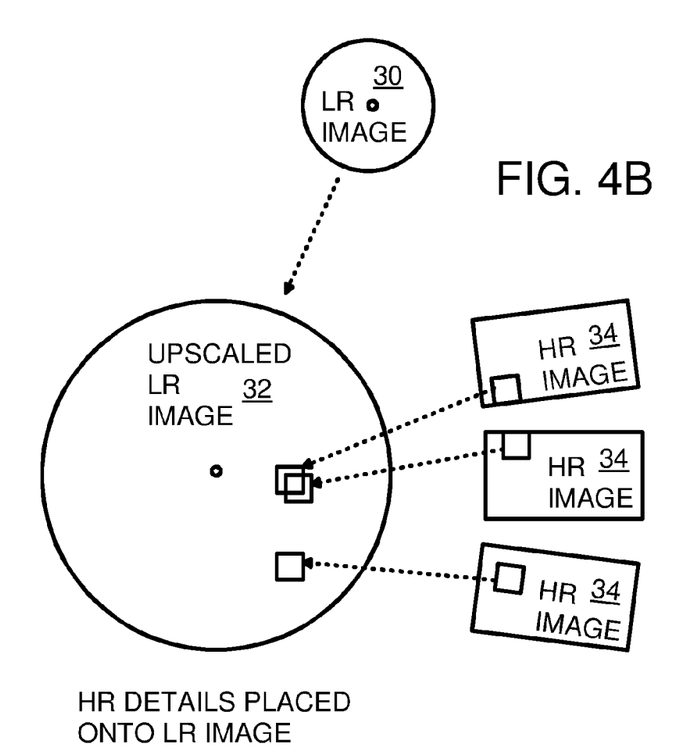
Figure 4C:
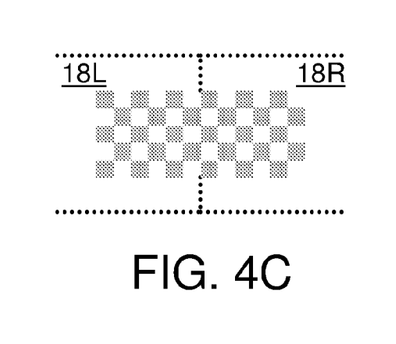

FIGS. 4A-C highlight image processing of panoramic camera images. In FIG. 4A, the prior art ring camera has a ring of HR cameras that generate HR images 18, each of a small arc of the full panoramic circle. HR images 18 overlap each other and details from two of HR images 18 are combined in some manner in stitch regions 19. While good image quality is obtained for most areas of HR images 18, image quality deteriorates in stitch regions 19 due to parallax errors between two of the HR cameras in the ring, resulting in ghosting image artifacts.

In FIG. 4B, when Hybrid camera rig 20 is used, LR camera 24 captures LR image 30 which shows the entire panoramic scene, but in a lower resolution. LR image 30 is upscaled to the high resolution of HR cameras 22 to generate upscaled LR image 32. HR images 34 are captured by HR cameras 22 for a small arc of the panoramic scene. Patches of HR details from HR images 34 are mapped onto the corresponding places on upscaled LR image 32.

At the edges of HR images 34, there may be overlapping details from two different ones of HR images 34. The exact placement of these HR details is provided by upscaled LR image 32. Image processing may combine details from two of HR images 34 that overlap, but the placement of these details is known from upscaled LR image 32. Thus parallax errors are eliminated and ghosting artifacts suppressed.

FIG. 4C shows a test pattern that spans the field of view of two adjacent HR cameras 22. Since the panoramic image from LR camera 24 provides a framework of object locations, although at low resolution, the location of image objects is already provided by upscaled LR image 32. When the HR details from HR images 18L and 18R are placed onto the framework of upscaled LR image 32, it is merely the details and texture that are being provided by HR cameras 22. The object locations are provided by upscaled LR image 32. Thus the object's depth is not needed since the object location is already known from the LR image.

Any ghosting or distortion would be limited to the difference between LR and HR. For example, when HR is 4 times LR, the HR details could be placed in any of four HR pixel locations for each LR pixel location. Parallax errors greater than four pixel locations would not occur, since the object placement is determined by the LR image.

Figure 5:
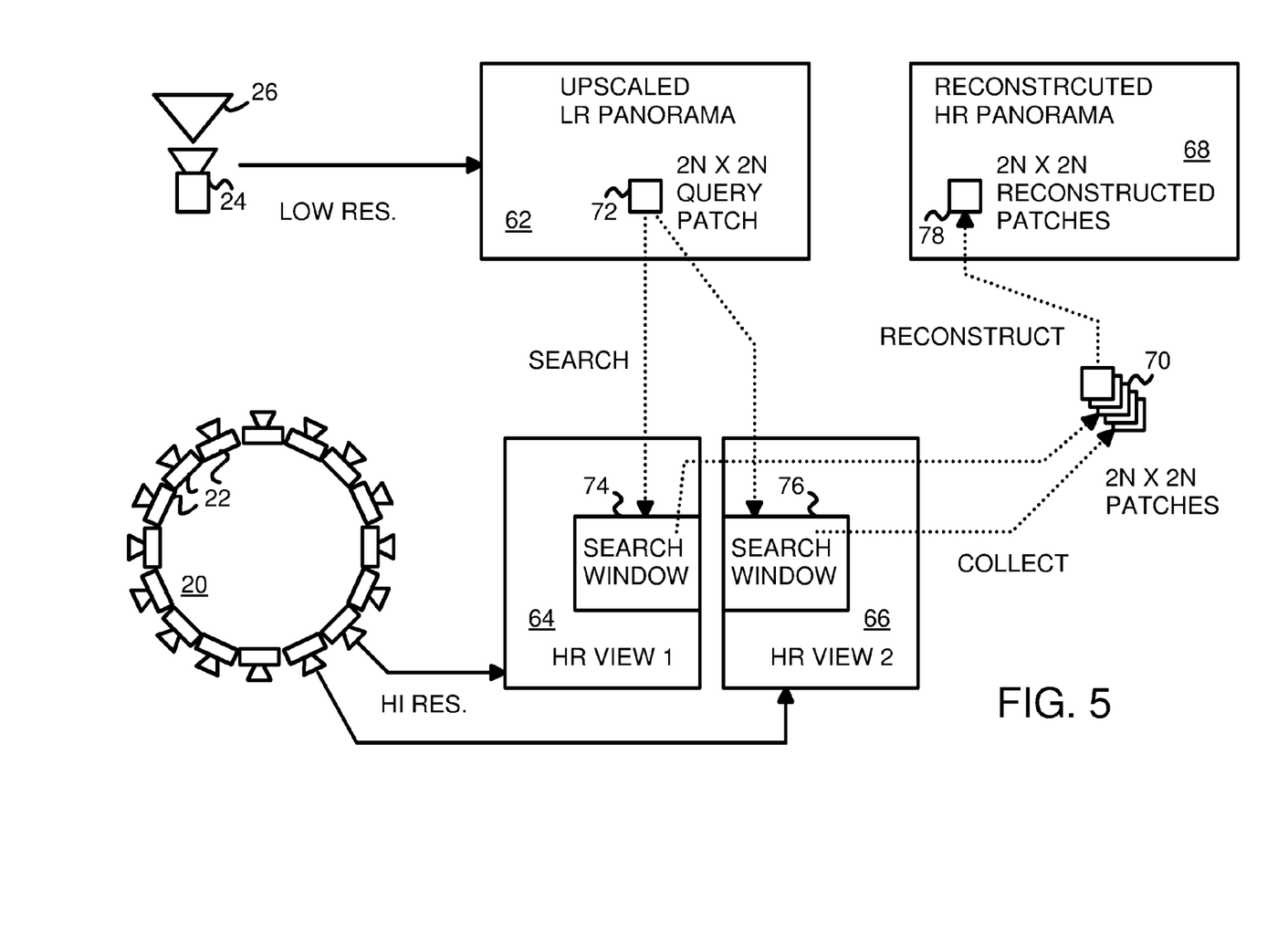
FIG. 5 shows using a 360-degree LR image as a framework to add HR image details.

FIG. 5 shows using a 360-degree LR image as a framework to add HR image details. LR camera 24 uses panoramic mirror 26 to capture a panoramic image that has a lower resolution than from HR cameras 22 due to the wider field of view of LR camera 24 compared with each of HR cameras 22. The 360-degree LR image is upscaled to the HR space to generate upscaled LR image 62.

Two adjacent HR cameras 22 in the ring portion of Hybrid camera rig 20 produce HR view 1 (HR image 64) and HR view 2 (HR image 66).

Patches in upscaled LR image 62 are identified and processed, such as by scanning from upper left to lower right, across rows and down lines. Patches could be one or more macroblocks and have various shapes, such as a rectangle, triangle, ladder-shaped, or a portion of the pixels in a rectangle. A current query patch 72 in upscaled LR image 62 is searched for in search window 74 in HR image 64, and also searched for in search window 76 in HR image 66. Search windows 74, 76 correspond to the location of query patch 72 and some surrounding area. Since HR image 64 and HR image 66 overlap for adjacent HR cameras 22, query patch 72 near the image interface can have matches in both HR image 64 and HR image 66. Other query patches that are not near interfaces may have matches in only one HR image, and only one search window is necessary.

The possible matching patches in search window 74 are evaluated, such as by sum-of-the-absolute difference (SAD), and the best matching patch is found within search window 74. This best-matching patch is collected into best-matching patches 70. Likewise, many possible matching patches in search window 76 in HR image 66 are evaluated, such as by SAD with query patch 72, and the best-matching patch found from search window 76 and added to best-matching patches 70. There may be more than one best-matching patch found in each search window 74, 76.

Best-matching patches 70 are evaluated, such as by evaluating similarity with each of best-matching patches 70 and query patch 72 using various similarity measurements or factors. The similarity parameters for each of best-matching patches 70 can be used as a weighting factor to blend best-matching patches 70 together, or to select a subset of best-matching patches 70 for blending, or to select a single one of best-matching patches 70. Poorly matching patches can be discarded. The selected one best-matching patch or the blended best-matching patch generated from best-matching patches 70 is output as reconstructed patch 78. Reconstructed patch 78 is placed at the location of query patch 72 within reconstructed HR panorama image 68.

Reconstructed HR panorama image 68 can be an initially blank frame with the same size and resolution as upscaled LR image 62 that is gradually built up as reconstructed patches 78 are added. Reconstructed HR panorama image 68 could also be a copy of upscaled LR image 62 that has each query patch 72 replaced with reconstructed patch 78 as subsequent patches are processed.

The patches are 2N×2N LR pixels in size since they are in the HR space. Searching is performed at the HR rather than at the LR to obtain better matches since none of the HR pixels are lost by downscaling to LR.

Reconstructed HR panorama image 68 is free of ghosting artifacts due to parallax errors since the upscaled LR image 62 served as a framework for receiving reconstructed patches 78 at the locations of query patches 72.

Figure 6:
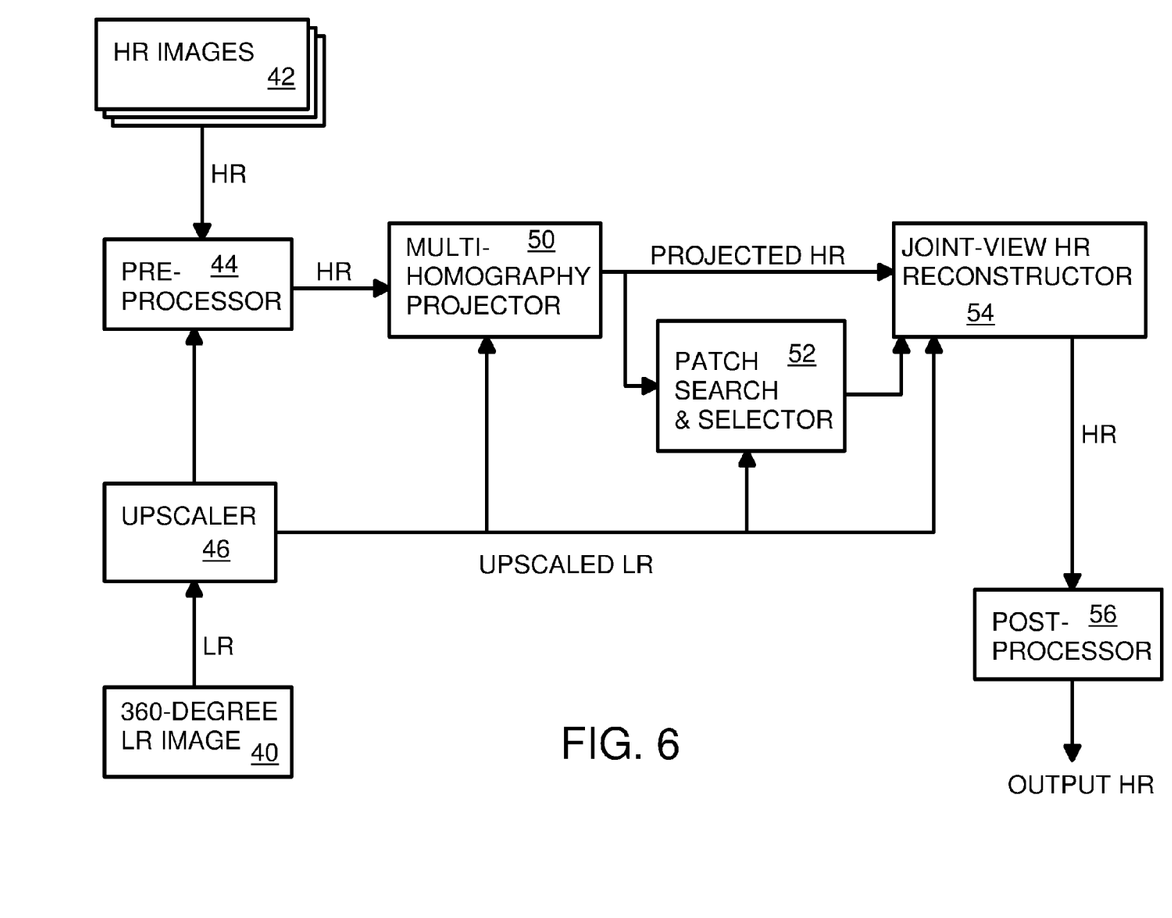
FIG. 6 is a block diagram of a hybrid-resolution panoramic processor.

FIG. 6 is a block diagram of a hybrid-resolution panoramic processor. HR images 42 are generated by HR cameras 22 that each have a narrow field of view, while 360-degree LR image 40 is generated by LR camera 24 using panoramic mirror 26 to capture a wide field of view that spans all views of HR images 42. A ghosting-free but low-resolution panorama is provided by 360-degree LR image 40, while HR image details and texture is provided by HR images 42.

Upscaler 46 upscales 360-degree LR image 40 to the HR resolution used by HR images 42. Upscaling can be performed by various methods, such as blending or averaging adjacent LR pixels to generate additional HR pixels to fill interstitial points between the original LR pixels in the HR space.

The upscaled LR image is provided as an image framework to pre-processor 44, multi-homography projector 50, patch search and selector 52, and to joint-view reconstructor 54. The upscaled LR image from upscaler 46 contains the exact locations of objects that are visible to both LR camera 24 and to one or more of HR cameras 22, but without parallax errors since 360-degree LR image 40 is from a single camera. Being free of parallax errors, ghosting artifacts are avoided.

HR images 42 are pre-processed by pre-processor 44, such as by sharpening edges, reducing distortions, removing lens distortions by calibration and rectification, and by adjusting or normalizing brightness. Multiple homographic projections are generated from each HR image by homography projector 50. For example, objects in an HR image can be detected, and the distance to each object estimated. Three of these distances can be selected, and a homographic matrix generated for each of the three distances. Each of the three homographic matrixes can be used to generate a homographic projection. Thus each HR image is expanded to three projected HR images by homography projector 50.

HR patches such as macroblocks from each projected HR image are used to search for best-matching patches in the upscaled LR image. Patch search and selector 52 may use errors generated by homography projector 50 to limit the sizes of search windows to reduce computational complexity. A best-matching patch is found for each of the three homographicly-projected HR images.

A similarity parameter is generated for each of the three best-matching patches, such as from a sum-of-the-absolute difference (SAD) or using other correlation factors. Geometric factors and pixel weighting factors may be used. Geometric weighting is based on homographic projection errors (residues). If a homographic projection error (residue) is large, the weighting for the best-matching patches from this homographicly-projected HR image may be set to a small value. The similarity parameters can be used to weight the three best-matching patches to blend them together to obtain a blended HR patch that can be placed onto the upscaled LR image at the location of the searched patch. Alternately, the blended HR patch may be blended with the upscaled LR patch.

Joint-view reconstructor 54 obtains the best-matching patches from patch search and selector 52 and uses the similarity parameters to perform pixel blending to generate the blended HR patches, and places these reconstructed patches onto the upscaled LR image (or onto a blank image at the locations of the searched patches from the upscaled LR image) to generate a reconstructed HR panorama.

Some objects near the edges of HR images may be seen in two adjacent HR images. Blending is performed over six best-matching patches rather than just three best-matching patches since there are two HR image sources rather than just one HR image source.

The reconstructed HR panorama image from joint-view reconstructor 54 is sent to post-processor 56 for post-processing, such as smoothing edges and enhancing colors or adjusting contrast or brightness. The final HR output is free of parallax-error ghosting. The final HR output can be used to construct a Virtual Reality (VR) space that a user can explore using a Head-Mounted-Display (HMD) or other headset or VR viewer.

Figure 7:
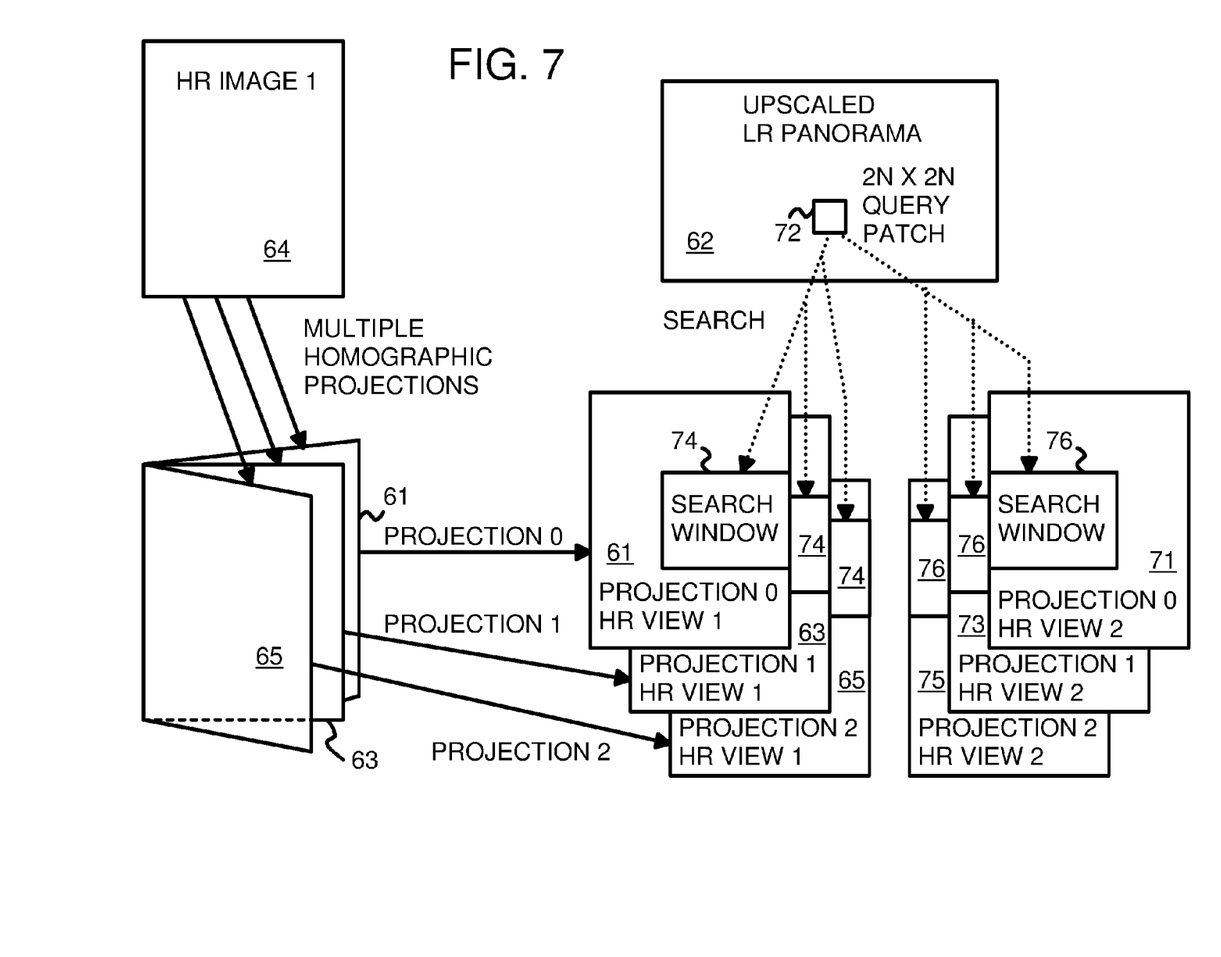
FIG. 7 shows searching multiple homographic projections for each HR image.

FIG. 7 shows searching multiple homographic projections for each HR image. A single HR image, such as HR image 64 in FIG. 5, may have multiple homographic projections 61, 63, 65. Each of homographic projections 61, 63, 65 assumes a different homographic variable, such as a different distance to an object, a different camera-to-camera distance, or a different angle to an adjacent camera or to an object.

Objects within HR image 64 can be identified. Objects may be grouped together when generating homographic projections 61, 63, 65.

A homographic matrix can be generated for each group of objects, and the homographic matrixes used to generate homographic projections 61, 63, 65. Some feature points (such as rectangle corners, etc.) are extracted from the HR image, and these feature points are grouped together according to distance, (the near points are grouped together). Each group of feature points can yield a homographic matrix. Each homographic matrix can project a HR image.

Query patch 72 in upscaled LR image 62 is searched for in each of homographic projections 61, 63, 65 of the single HR image 142. Query patch 72 is searched for in three search windows 74 in homographic projections 61, 63, 65, producing three best-matching patches, one for each of homographic projections 61, 63, 65.

Likewise, HR image 66 is projected using three homographic matrixes to generate homographic projections 71, 73, 75. Query patch 72 is searched for in three search windows 76 in homographic projections 71, 73, 75, producing three best-matching patches, one for each of homographic projections 71, 73, 75.

Figure 8:
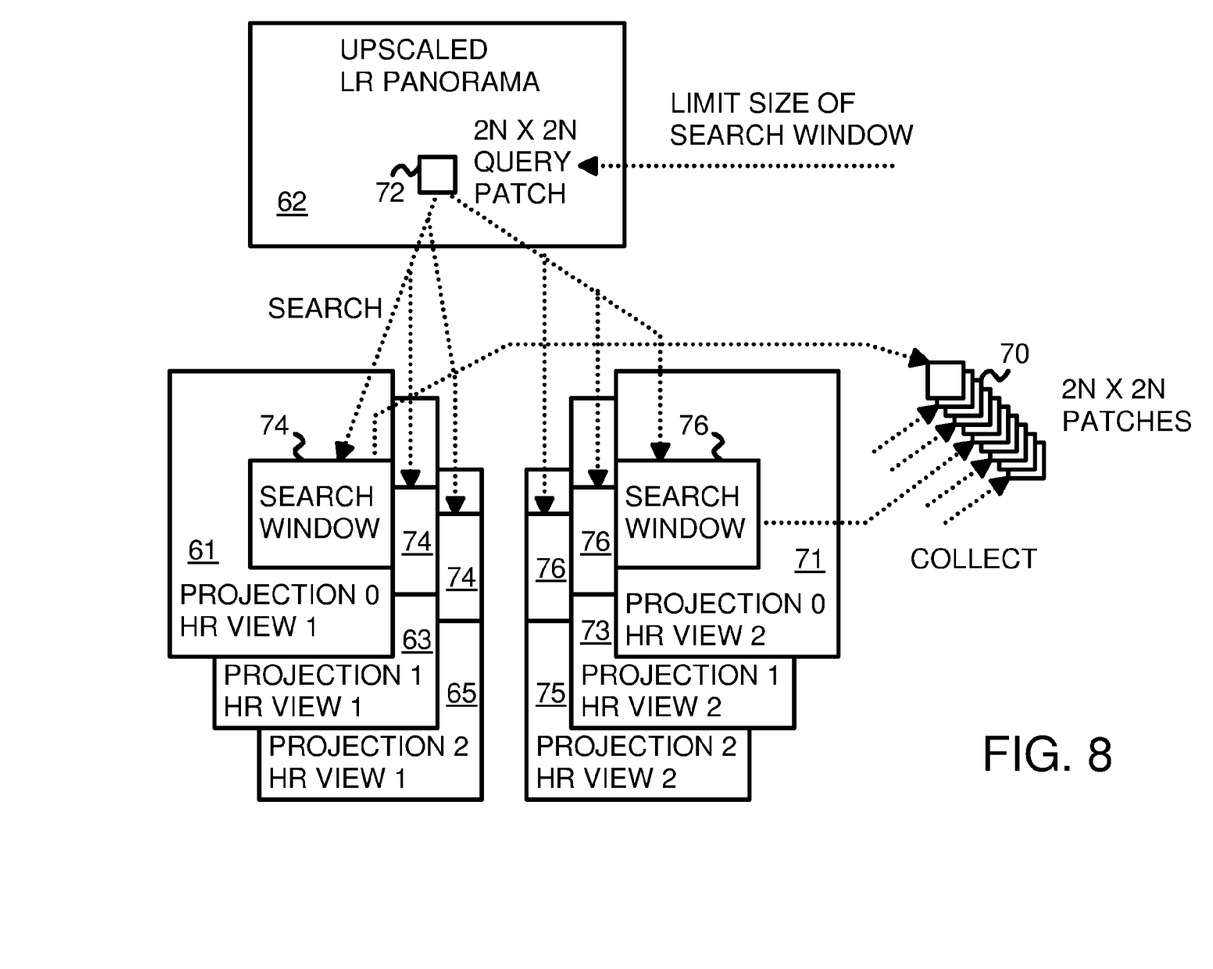
FIG. 8 shows selecting from among multiple best-matching patches found by searching multiple homographic projections for each HR image.

FIG. 8 shows selecting from among multiple best-matching patches found by searching multiple homographic projections for each HR image. Query patch 72 in upscaled LR image 62 is searched. The best-matching patches from search windows 74 in homographic projections 61, 63, 65 are collected into best-matching patches 70, along with the best-matching patches from search windows 76 in homographic projections 71, 73, 75.

A similarity parameter is obtained for each of best-matching patches 70 to quantify similarity with query patch 72. The similarity parameter can include factors for traditional patch and pixel similarity, and for geometric similarity, such as shapes having the same proportions.

The weighting for pixel at position (x, y), which is within a best-matching patch 70, can be calculated by the following equation:

$$\omega(x, y) = \underbrace{\exp\left(\frac{PatchSimilarity}{\sigma_P}\right) \cdot \exp\left(-\frac{|I_c(u, v) - I(x, y)|}{\sigma_I}\right)}_{TraditionalTerm} \cdot$$

$$\underbrace{\exp\left(\frac{GeometricSimilarity}{\sigma_P}\right)}_{GeometricWeighting}$$

where 'PatchSimilarity' can be a sum-of-the-absolute difference (SAD) between patch 70 and query patch 72; where I(x,y) and $I_c$(u,v) indicate the luma (or RGB) value of a pixel at position (x,y) and at the patch center (u,v); where 'GeometricSimilarity' is proportional to the homographic projection error of the projected image that patch 70 is from; where $\sigma_p$ and $\sigma_I$ are parameters obtained from experiments.

The similarity parameter is used to weight each of the best-matching patches 70. Patches with low values of the similarity parameter can be discarded, and the remaining patches blended together using the similarity parameter as a weight. The resulting blended patch is reconstructed patch 78 that is placed into reconstructed HR panorama image 68 (FIG. 5). Using multiple homographic projections allows the most relevant information to be used when generating reconstructed patch 78.

Errors from generating homographic projections 61, 63, 65 can be used to limit or reduce the size of search window 74. An upper bound for the homographic projection errors (residues) can be set. Projections with errors that are larger than this upper bound are discarded. Then the maximal bias of the searching window center is calculated. This maximal bias is the window size of search window 74.

Figure 9:
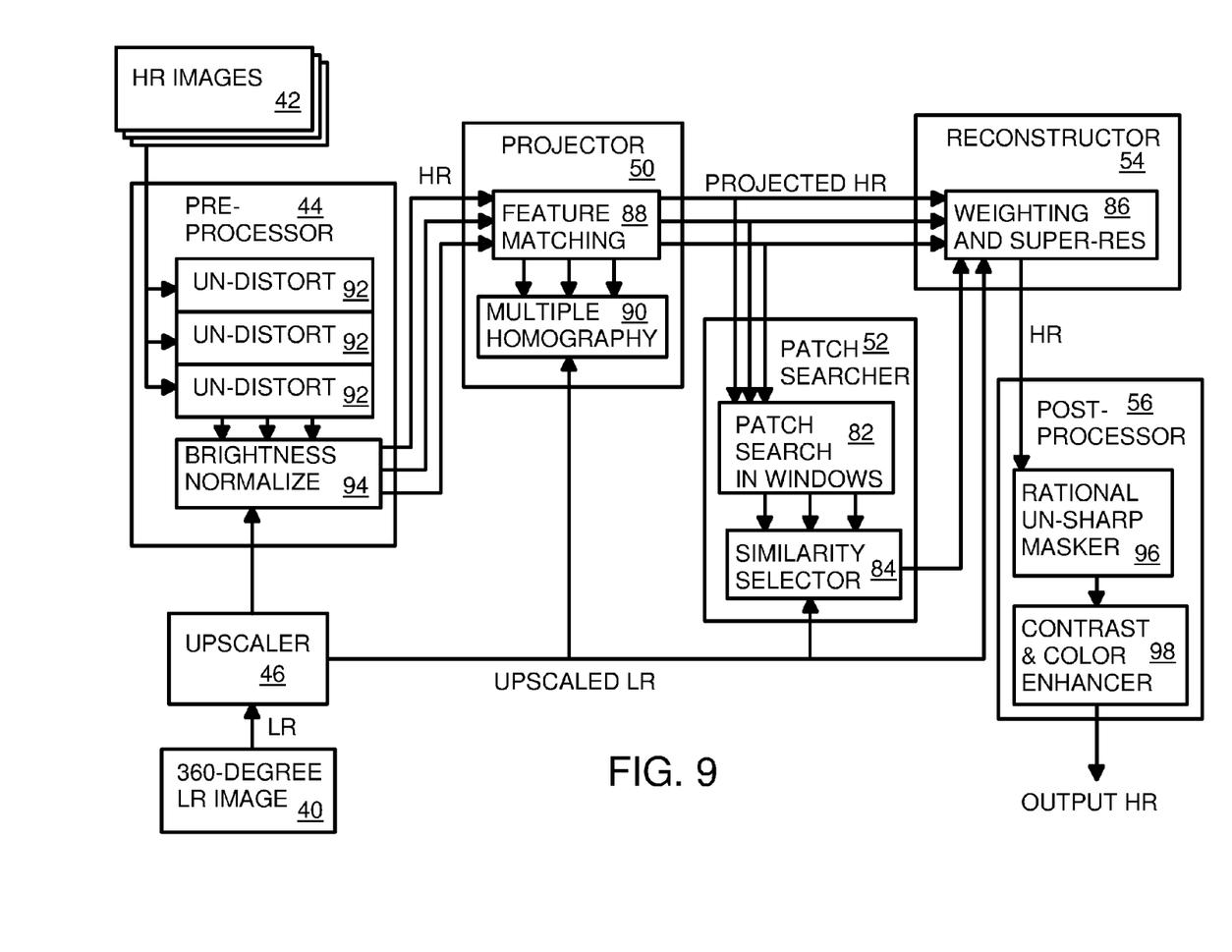
FIG. 9 is a more detailed block diagram of a multi-homographic projection hybrid-resolution panoramic processor.

FIG. 9 is a more detailed block diagram of a multi-homographic projection hybrid-resolution panoramic processor. Patches from multiple HR images 42 are placed into locations identified in 360-degree LR image 40.

Upscaler 46 generates additional pixels to increase the resolution of 360-degree LR image 40 to the higher resolution of HR images 42. Additional pixels can be generated by blending adjacent LR pixels using a variety of upscaling techniques.

The upscaled LR image is provided as an image framework to pre-processor 44, multi-homography projector 50, patch search and selector 52, and to reconstructor 54. The upscaled LR image from upscaler 46 contains the exact locations of objects that are visible to both LR camera 24 and to one or more of HR cameras 22, but without parallax errors since 360-degree LR image 40 is from a single camera. Being free of parallax errors, ghosting artifacts are avoided.

HR images 42 are pre-processed by pre-processor 44. Un-distortion units 92 remove distortions that might be caused by panoramic mirror 26, such as warping due to the mirror's shape, or mirror supports that may partially block the view of LR camera 24. Edges may be sharpened such as by using a Laplace filter. Brightness unit 94 adjusts the brightness of pixels in HR images 42, such as by brightening darker pixels and darkening bright pixels. Brightness may be normalized.

Multiple homographic projections are generated from each HR image by homography projector 50. Objects in an HR image are identified and feature points extracted by feature matcher 88. Objects are grouped into three subsets or groups according to features such as apparent depth, brightness, shape, etc. Each group identified by feature matcher 88 has a homography matrix generated for that group by homography unit 90, and the homography matrix is applied to the entire HR image to generate a HR projection. One HR projection is generated for each group identified by feature matcher 88. For three groups, homography unit 90 generates three homographic projections per HR image. Each HR image is expanded to three projected HR images by homography projector 50.

The three homographic projections generated by homography projector 50 are sent to patch search and selector 52. Patch search and selector 52 calculates the similarities of the best-matching patches to the query patch in three homographic projections, while joint-view reconstructor 54 uses both the three homographic projections from homography projector 50 and the similarities from patch search and selector 52 for reconstruction.

HR patches such as macroblocks from each projected HR image from homography projector 50 are used to search for best-matching patches in the upscaled LR image. Patch search and selector 52 may use errors generated by homography projector 50 to limit the sizes of search windows to reduce computational complexity.

Window searcher 82 compares query patch 72 from upscaled LR image 62 to all possible patches in search windows 74 in homographic projections 61, 63, 65 (FIG. 7). A best-matching patch is found for each homographic projection. When query patch 72 might be found in two adjacent HR images, three homographic projections are searched for each of the two adjacent HR images. These best-matching patches 70 are collected an then evaluated by similarity selector 84, which generates similarity parameters for each of best-matching patches 70. Geometric factors and pixel weighting factors may be used.

The similarity parameters can be used by weighting unit 86 in joint-view reconstructor 54 to weight the three or six best-matching patches found by patch search and selector 52 to blend them together to obtain reconstructed patch 78. Joint-view reconstructor 54 generates reconstructed patch 78 and places it into reconstructed HR panorama image 68 at the location of query patch 72 within upscaled LR image 62.

The reconstructed HR panorama image from joint-view reconstructor 54 is sent to post-processor 56 for post-processing. Masker 96 smoothes edges using a rational un-sharpening mask. Color enhancer 98 enhances colors and adjusts contrast and brightness. The final HR output is free of parallax-error ghosting. The final HR output can be used to construct a Virtual Reality (VR) space that a user can explore using a Head-Mounted-Display (HMD) or other headset or VR viewer.

Alternate Embodiments

Several other embodiments are contemplated by the inventors. For example, panoramic mirror 26 can be a conical, spherical, parabolic, elliptical, hyperbolic, curved, fisheye, or other shaped mirror. Low resolution panoramic cameras, or any other 180 degree or partial panoramic set ups may be substituted for panoramic mirror 26. The image may be distorted due to the shape of panoramic mirror 26, but image-processing software can compensate for image warping due to the mirror's shape, since the mirror's shape is constant and known.

While LR camera 24 has been described as a low-resolution camera, a high-resolution camera could be substituted. LR camera 24 could have the same native resolution as HR cameras 22, or could be configured or programmed to capture lower resolution images. LR camera 24 could be a HR camera but panoramic mirror 26 collects image details from a much wider scene so that the pixel density of an object seen by LR camera 24 is lower than the pixel density of the same object seen by HR camera 22. LR camera 24 may not actually be an inferior camera, or have a lower resolution, but its resolution is spread out over a wider 360 degrees, whereas the full resolution of HR cameras 22 is fixed on a small arc of the full panorama. Each HR image may contain fewer overall pixels than does 360-degree LR image 40, but still have a higher resolution of picture details due to its reduced arc field of view.

The same kind or type of camera may be used for LR camera 24 and for HR cameras 22. Also, panoramic mirror 26 may distort the image or blur image details so that the image quality seen by LR camera 24 is lower that that seen by HR cameras 22 without any intervening mirror.

HR images may be taller or shorter than the 360-degree LR image. When the HR images are shorter, there may be areas near the top and bottom of reconstructed HR panorama image 68 that lack HR details. When the HR images are taller, some HR details may be discarded, or may be placed into reconstructed HR panorama image 68 by other, perhaps less precise methods. The upscaled LR image 62 may be smaller than reconstructed HR panorama image 68 when the HR images are taller than 360-degree LR image 40.

Precise calibration of multiple cameras and the distances and angles between them is not necessary since LR camera 24 provides relative object locations. HR cameras 22 just provide image details such as textures. A less expensive camera rig may be used. While 360-degree LR image 40 has been described as having a 360-degree view, some parts of the view may be obstructed, such as by support bars that attach panoramic mirror 26 to Hybrid camera rig 20. The obstructed regions tend to be small and may be filled in with details from HR images using various methods.

Patches could be one or more macroblocks and have various shapes. Patches could vary in size and shape within an image. For example, larger patches could be used in flat or uncomplicated regions while smaller patches are used in detailed regions such as at edges of objects. Various adaptive routines could be used. Patches could be non-overlapping or overlapping. Patch matching can compare differences in all color components such as YUV or RGB, or can just compare one or two components such as luminance Y. Raw input camera data may be encoded such as with MPEG and need to be de-compressed before processing.

While three homographic projections 61, 63, 65 from each HR image 64 have been described, other numbers of homographic projections could be substituted. Some HR images could have more homographic projections generated that other HR images. For example, an HR image pointing at open sky might need only one projection while an HR image pointing at a cluttered desk and an open window with a tree in the distance might benefit from more than three homographic projections 61, 63, 65.

The resolution of reconstructed HR panorama image 68 could be different than that of the HR images. The HR images could be scaled up or down to the resolution of reconstructed HR panorama image 68. Reconstructed HR panorama image 68 could itself be scaled up or down in resolution. Various other pre- and post-processing operations could be performed. Reconstructed HR panorama image 68 could undergo further post-processing to be used to generate a 3D model of the VR space seen by hybrid camera rig 20. Video or still images could be captured by HR cameras 22 and LR camera 24. One upscaled LR image 62 could be generated for a sequence of multiple HR images for each of HR cameras 22 when LR camera 24 is slower than HR cameras 22. 360-degree LR image 40 and HR images 42 do not have to be exactly synchronized together, although better results ma occur when they are synchronized. LR camera 24 could be a gray-scale or black and white camera while HR cameras 22 capture full color. Color pixels could be converted to gray scale for searching search windows 74 with query patch 72. Color systems could be converted during pre or post processing, such as between YUV and RGB, or between pixels having different bits per pixel. Various pixel encodings could be used, and frame headers and audio tracks could be added. GPS data or camera orientation data could also be captured and attached to the video stream.

While sum-of-the-absolute difference (SAD) has been described as a method to evaluate patch similarity, other evaluation methods may be used, such as Mean-Square-Error (MSE), Mean-Absolute-Difference (MAD), Sum-of-Squared Errors, etc. Rather than use macroblocks as patches, smaller blocks may be used, especially around object boundaries, or larger blocks could be used for background or objects. Regions that are not block shaped may also be operated upon.

When used as a patch, the size of the macroblock may be 8×8, 16×16, or some other number of pixels. While macroblocks such as 16×16 blocks and 8×8 have been described, other block sizes can be substitutes, such as larger 32×32 blocks, 16×8 blocks, smaller 4×4 blocks, etc. Non-square blocks can be used, and other shapes of regions such as triangles, circles, ellipses, hexagons, etc., can be used as the patch region or "block". Adaptive patches and blocks need not be restricted to a predetermined geometrical shape. For example, the sub-blocks could correspond to content-dependent sub-objects within the object. Smaller block sizes can be used for very small objects.

The size, format, and type of pixels may vary, such as RGB, YUV, 8-bit, 16-bit, or may include other effects such as texture or blinking. The search range of the query patch in the search window may be fixed or variable, and may have an increment of one pixel in each direction, or may increment in 2 or more pixels or may have directional biases. Adaptive routines may also be used. Larger patch sizes may be used in some regions, while smaller patch sizes are used near object boundaries or in regions with a high level of detail.

Different search ranges and methods can be used when searching for the best-matching patch. For example, a diamond-shaped search pattern or a 3-point pattern may be more efficient than exhaustively searching a square region. Different search strategies can be used to further speed up the computation.

Various combinations of hardware, programmable processors, and firmware may be used to implement functions and blocks. Pipelining may be used, as may parallel processing. Various routines and methods may be used, and factors such as the search range may also vary.

It is not necessary to fully process all patches in each time-frame. For example, only a subset or limited area of each frame could be processed. It may be known in advance that a moving object only appears in a certain area of the panoramic frame, such as a moving car only appearing on the right side of a panorama captured by a camera that has a highway on the right but a building on the left. The "frame" may be only a subset of the still image captured by a camera or stored or transmitted.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A hybrid-resolution panoramic processor comprising:
    a panorama input for receiving a 360-degree image of a 360-degree scene;
    a detailed-view input for receiving a plurality of High-Resolution (HR) images taken by a plurality of HR cameras, each HR image covering only a limited-arc portion of the 360-degree scene;
    wherein the plurality of HR images have a higher pixel density of visible objects in the 360-degree scene than does the 360-degree image;
    an upscaler that generates additional pixels for insertion into the 360-degree image to generate an upscaled 360-degree image;
    a patch searcher for scanning the upscaled 360-degree image to locate a plurality of query patches, and for each query patch, searching a search window within an HR image to locate a best-matching HR patch in the HR image, and for a query patch near an interface between adjacent HR images, also searching a second search window within a second HR image to locate a second best-matching HR patch in the second HR image;
    a patch collector that collects the best-matching HR patch and the second best-matching HR patch;
    a patch evaluator that generates a similarity parameter for each best-matching HR patch collected by the patch collector, the similarity parameter quantifying a visual similarity of a best-matching HR patch with a query patch;
    a reconstructed patch generator that blends the best-matching HR patch and the second best-matching HR patch using the similarity parameters as blending weights to generate a reconstructed patch; and
    a joint-view reconstructor that places the reconstructed patch onto a reconstructed HR panorama image at a location of the query patch within the upscaled 360-degree image.

2. The hybrid-resolution panoramic processor of claim 1 wherein parallax errors at the interface between adjacent HR images are eliminated by using the 360-degree image as a location framework for receiving the reconstructed patches generated from the adjacent HR images,
    whereby visual ghosting artifacts caused by parallax errors when stitching together adjacent HR images are eliminated.

3. The hybrid-resolution panoramic processor of claim 1 further comprising:
    a homography projector that receives each HR image and generates a plurality of homographic projections, wherein the patch searcher receives the plurality of homographic projections for each HR image, and searches the query patch in a plurality of search windows in the plurality of homographic projections to find a plurality of best-matching HR patches for each HR image;
    wherein the patch collector collects the plurality of best-matching HR patches for each HR image;
    wherein the patch evaluator generates a plurality of similarity parameter for each of the plurality of best-matching HR patches collected by the patch collector;
    wherein the reconstructed patch generator blends a plurality of the best-matching HR patches and, at the interface between adjacent HR images, a plurality of the second best-matching HR patches using the similarity parameters as blending weights to generate the reconstructed patch,
    whereby multiple homographic projections are generated, searched, evaluated, and blended for each HR image.

4. The hybrid-resolution panoramic processor of claim 3 further comprising:
    a search window size adjustor that receives projection errors generated by the homography projector when generating the plurality of homographic projections for the HR image, the search window size adjustor adjusting a size of the search window for the HR image in response to the projection errors,
    whereby search window size is adjusted for homographic projection errors.

5. The hybrid-resolution panoramic processor of claim 3 wherein the homography projector further comprises:
    a feature matcher that searches an HR image for feature points, and sorts the feature points into a plurality of subsets based on a predicted depth position within the HR image;
    a matrix generator that generates a homographic matrix for each of the plurality of subsets; and
    a homographic projection generator that applies the homographic matrix to the HR image to generate a homographic projection for each of the plurality of subsets.

6. The hybrid-resolution panoramic processor of claim 3 wherein the plurality of homographic projections comprises three homographic projections generated from each HR image.

7. The hybrid-resolution panoramic processor of claim 1 wherein the plurality of HR images comprises 16 HR images for each 360-degree image,
    whereby HR image details from 16 HR images are placed onto a location framework provided by a single 360-degree image.

8. The hybrid-resolution panoramic processor of claim 7 wherein the plurality of HR images have a higher pixel density of visible objects in the 360-degree scene than does the 360-degree image by at least a factor of 2 rows of pixels and 2 columns of pixels.

9. The hybrid-resolution panoramic processor of claim 7 further comprising:
    a Hybrid camera rig that comprises:
    a plurality of HR cameras that capture a plurality of HR images, the plurality of HR cameras being in a ring plane and pointing outward from a ring;
    a wide-field camera having a lens that points in a direction normal to the ring plane of the plurality of HR cameras; and
    a panoramic mirror situated in front of the lens of the wide-field camera, the panoramic mirror capturing light from objects also seen by the plurality of HR cameras, the panoramic mirror capturing light from objects also seen by each of the plurality of HR cameras.

10. The hybrid-resolution panoramic processor of claim 9 wherein the panoramic mirror is a conical mirror.

11. The hybrid-resolution panoramic processor of claim 9 wherein the panoramic mirror is a spherical mirror, a parabolic mirror, a hyperbolic mirror, or an elliptical mirror.

12. The hybrid-resolution panoramic processor of claim 1 further comprising:
a pre-processor that removes distortions and normalizes brightness of the plurality of HR images before processing by the patch searcher; and
a post-processor that enhances colors and contrast of the reconstructed HR panorama image before output as an HR panoramic image.

13. A method for generating a High-Resolution (HR) panoramic image comprising:
receiving a plurality of HR images from a ring of HR cameras;
receiving a 360-degree Low-Resolution (LR) image from a vertical camera pointed out of a plane of the ring of HR cameras into a panoramic mirror that captures a LR panoramic image that includes at least a portion of the plurality of HR images for all HR cameras in the ring of HR cameras;
wherein the plurality of HR images have a higher resolution of imaged objects visible by both one of the HR cameras and by the vertical camera and the 360-degree LR image has a lower resolution of the imaged objects;
upscaling the 360-degree LR image to a higher resolution space to generate an upscaled LR image;
partitioning the upscaled LR image into a plurality of query patches;
multi-projecting each of the plurality of HR images to a space of a reconstructed HR panorama image using multiple homographic matrixes to generate a plurality of homographic projections;
searching a search window in each of the plurality of homographic projections generated from each HR image for a best-matching patch that is similar to a query patch in the upscaled LR image;
selecting from among a plurality of the best-matching patch according to similarity with the query patch to generate selected patches;
blending the selected patches to generate a reconstructed patch; and
placing the reconstructed patch into the reconstructed HR panorama image at a location of the query patch within the upscaled LR image to add HR image details to the upscaled LR image using the upscaled LR image for patch location information;
whereby HR details from the plurality of HR images are placed onto the upscaled LR image that provides patch location information.

14. The method of claim 13 further comprising:
generating a similarity parameter for each of the best-matching patch, the similarity parameter based on visual similarity to the query patch.

15. The method of claim 14 wherein the similarity parameter includes factors for geometric and pixel similarity.

16. The method of claim 14 further comprising:
using the similarity parameter as a weight when blending the selected patches to generate the reconstructed patch.

17. The method of claim 13 wherein upscaling the 360-degree LR image to a higher resolution space comprises upscaling to a resolution of the plurality of HR images.

18. The method of claim 13 further comprising:
wherein the plurality of HR images have a higher HR resolution of imaged objects visible by both one of the HR cameras and by the vertical camera and the 360-degree LR image has a lower LR resolution of the imaged objects;
wherein the higher HR resolution is later than the lower LR resolution by at least a factor of 2×2 in resolution.

19. The method of claim 13 wherein ghosting artifacts caused by stitching together adjacent HR images are eliminated by using the upscaled LR image.

20. A dual-resolution panoramic Virtual Reality (VR) generator comprising:
HR input means for receiving a plurality of HR images from a plurality of HR cameras;
LR input means for receiving a wide-field Low-Resolution (LR) image from a vertical camera pointed out of a plane of the HR cameras into a panoramic mirror that captures a LR panoramic image that includes at least a portion of the plurality of HR images for all HR cameras;
wherein the plurality of HR images having a higher resolution of imaged objects and the wide-field LR image has a lower resolution of the imaged objects by at least a factor of 2×2;
upscaling means for upscaling the wide-field LR image to a higher resolution space to generate an upscaled LR image;
query means for partitioning the upscaled LR image into a plurality of query patches;
homography projector means for projecting each of the plurality of HR images to a space of a reconstructed HR panorama image using multiple homographic matrixes to generate a plurality of homographic projections;
search means for searching a search window in each of the plurality of homographic projections generated from each HR image for a best-matching patch that is similar to a query patch in the upscaled LR image;
evaluation means for generating a similarity parameter for each of the best-matching patch, the similarity parameter based on visual similarity to the query patch;
select means for selecting from among the plurality of the best-matching patch using the similarity parameter to generate selected patches;
blending means for blending the selected patches using the similarity parameters as weights to generate a reconstructed patch; and
joint-view reconstruction means for placing the reconstructed patch into the reconstructed HR panorama image at a location of the query patch within the upscaled LR image;
wherein HR image details are added to the upscaled LR image using the upscaled LR image for patch location information.

* * * * *